US008180811B2

(12) United States Patent
Shyam et al.

(10) Patent No.: US 8,180,811 B2
(45) Date of Patent: May 15, 2012

(54) IDENTIFYING UNREFERENCED FILE SYSTEM COMPONENTS

(75) Inventors: Nagaraj Shyam, Cupertino, CA (US); Craig Keatley Harmer, San Francisco, CA (US); George Matthew, Belmont, CA (US)

(73) Assignee: Symantec Corporation, San Jose, CA (US)

( * ) Notice: Subject to any disclaimer, the term of this patent is extended or adjusted under 35 U.S.C. 154(b) by 29 days.

(21) Appl. No.: 12/907,632

(22) Filed: Oct. 19, 2010

(65) Prior Publication Data

US 2012/0095970 A1 Apr. 19, 2012

(51) Int. Cl.
*G06F 17/30* (2006.01)

(52) U.S. Cl. .......................................... 707/819

(58) Field of Classification Search .................. 707/2, 3, 707/819; 709/201
See application file for complete search history.

(56) References Cited

U.S. PATENT DOCUMENTS

2011/0035428 A1* 2/2011 Thompson .................... 709/201

* cited by examiner

*Primary Examiner* — Etienne Leroux (57) ABSTRACT

A list of data structures (e.g., inodes) can be accessed, and the data structures in the list can be examined. If a data structure is examined, a counter value associated with the data structure is changed to a generation number that is associated with the examination. Subsequently, the counter values can be used to identify unreferenced data structures. More specifically, the counter value for an unreferenced data structure will be different from the generation number for the most recently performed examination.

20 Claims, 7 Drawing Sheets

IDENTIFYING UNREFERENCED FILE SYSTEM COMPONENTS

BACKGROUND

A file system may "leak" computer system resources—for example, a program or application may fail to release a resource that it will not use again, leading to exhaustion of that resource over time. The process of "garbage collection" is used by file systems to identify resources that are no longer in use and therefore can be freed up.

Some file systems utilize data structures such as inodes, each of which is identified by an index number (into an array). Inodes are allocated and freed when files are created and deleted by a user. An inode's allocation state is represented by setting a corresponding bit in a bitmap. Due to data corruption or inconsistencies resulting from operator error, hardware failure, firmware problems, etc., some inodes may no longer be used (referenced) by the file system but may still be marked as in use in the bitmap. If these unused (unreferenced) inodes are not identified, then it is possible that all inode numbers will eventually be assigned and numbers for new inodes will not be available.

Similarly, some data blocks may no longer be referred to by an inode but, for reasons such as those mentioned above, may not have been deleted from memory. If unreferenced data blocks are not identified, then they may begin to accumulate and consume a large number of data blocks.

A utility such as a file system consistency check (FSCK) can be used for garbage collection to identify unreferenced inodes and data blocks that are erroneously marked as referenced (allocated). However, the conventional FSCK garbage collection process maintains and relies upon large in-memory tables in order to track allocation of inodes and data blocks. As the size of the file system grows, so will the size of the in-memory tables, which can cause main memory allocation problems.

SUMMARY

According to embodiments of the present disclosure, the use of large in-memory tables for garbage collection can be avoided. Instead, in one embodiment, a list of data structures (e.g., inodes) is accessed and the data structures in the list are examined using a utility such as, but not limited to, FSCK. A generation or version number is associated with the utility is incremented each time an examination is started for the file system or database. If a data structure is examined (e.g., the data structure is reachable within the allocated set of data structures), then a counter value associated with the data structure is changed to the current generation number and the counter value is saved in persistent storage. Subsequently, the counter values can be used to identify unreferenced (unallocated) data structures because the counter value for an unreferenced data structure will be different from the current generation number.

More specifically, in one embodiment, when a FSCK is initiated, a FSCK generation number is read from storage and incremented. During the FSCK, each inode listed in an inode directory is accessed and validated. If an inode is accessed during the FSCK, then a counter value associated with that inode is updated to reflect the current FSCK generation number. After the inodes listed in the directory are traversed, the FSCK generation numbers associated with the inodes are compared to the current FSCK generation number to identify any unreferenced inodes—an inode is unreferenced if its respective FSCK generation number is different from the current FSCK generation number. In one embodiment, this is accomplished by accessing a second list (e.g., an inode list or ILIST) that identifies inodes and their corresponding FSCK generation numbers. The FSCK generation numbers in the second list are compared to the current FSCK generation number to identify any unreferenced inodes. Unreferenced inodes can be freed up (e.g., discarded or marked as free in the bitmap) or moved to a lost-and-found (lost+found) directory. Alternatively, a system administrator can be notified when unreferenced inodes are identified and can take the appropriate corrective action when it is suitable to do so.

The general approach described above can also be used to update an inode's link count.

A similar approach can be used to identify unreferenced data objects (e.g., data blocks) associated with the data structures (e.g., inodes). More specifically, in one embodiment, each inode is also given an inode version number. During the FSCK, each of the data objects associated with a particular inode is accessed and validated. If a data object is accessed during the FSCK, and if the data object's inode version number is the same as the current inode version number, then that data object's counter value is updated with the current FSCK generation number. After the data objects are traversed, the FSCK generation numbers associated with the data objects are compared to the current FSCK generation number to identify any unreferenced data objects—a data object is unreferenced if its respective FSCK generation number is different from the current FSCK generation number. In one embodiment, this is accomplished by accessing a separate data store that identifies the data objects and their corresponding FSCK generation numbers. The FSCK generation numbers in the data store are compared to the current FSCK generation number to identify any unreferenced data objects. Unreferenced data objects can then be discarded or marked as free in the bitmap.

In one embodiment, an identifier for a data object associated with an inode can be generated using the inode number for the inode, a partition number associated with the data object, and an offset value.

In summary, if a data structure (e.g., an inode) or a data object (data block) referenced by the data structure can be accessed during an examination process (e.g., during a FSCK), then the data structure/object may be marked (in persistent storage) with the current generation number for that process. By marking accessed (reachable) data structures and objects with the current generation number, unreferenced (unreachable) data structures/objects will have an older generation number and can be readily identified and freed up or moved to a lost+found directory. Accordingly, the use of large in-memory tables for garbage collection is avoided, reducing the amount of memory used for garbage collection.

These and other objects and advantages of the various embodiments of the present disclosure will be recognized by those of ordinary skill in the art after reading the following detailed description of the embodiments that are illustrated in the various drawing figures.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

DETAILED DESCRIPTION

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "accessing," "examining," "setting," "identifying," "discarding," "generating," "moving," "updating," "implementing," "changing," "comparing," "notifying," or the like, refer to actions and processes (e.g., flowcharts 900 and 1000 of FIGS. 9 and 10, respectively) of a computer system or similar electronic computing device or processor (e.g., system 110 of FIG. 1). The computer system or similar electronic computing device manipulates and transforms data represented as physical (electronic) quantities within the computer system memories, registers or other such information storage, transmission or display devices.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer-readable storage media and communication media; non-transitory computer-readable media include all computer-readable media except for a transitory, propagating signal. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared and other wireless media. Combinations of any of the above can also be included within the scope of computer-readable media.

Figure 1:
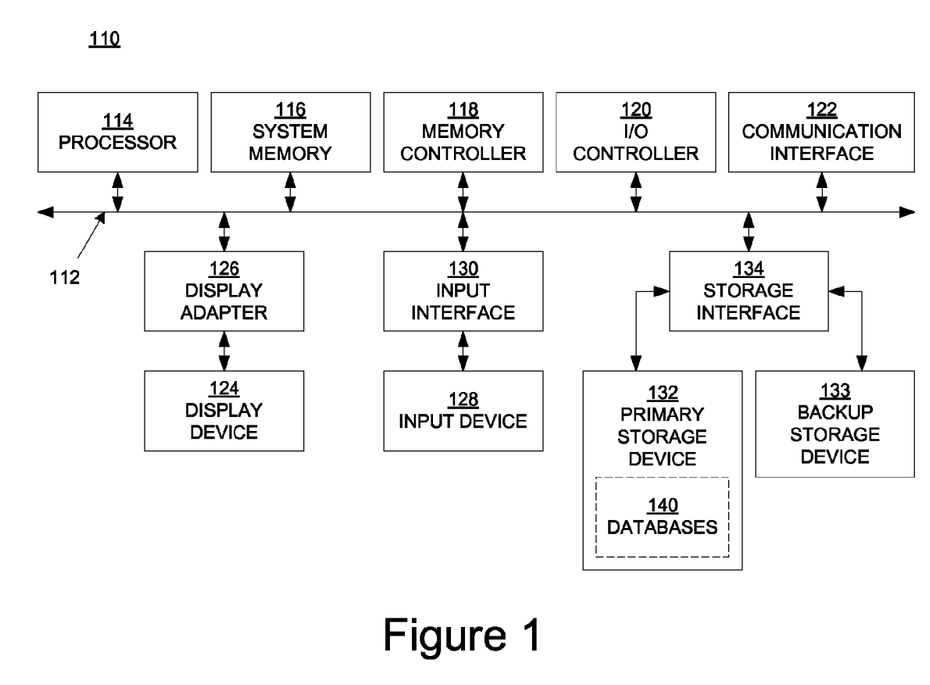
FIG. 1 is a block diagram of an example of a computer system upon which embodiments of the present disclosure can be implemented.

FIG. 1 is a block diagram of an example of a computing system 110 capable of implementing embodiments of the present disclosure. Computing system 110 broadly represents any single or multi-processor computing device or system capable of executing computer-readable instructions. Examples of computing system 110 include, without limitation, workstations, laptops, client-side terminals, servers, distributed computing systems, handheld devices, or any other computing system or device. In its most basic configuration, computing system 110 may include at least one processor 114 and a system memory 116.

Processor 114 generally represents any type or form of processing unit capable of processing data or interpreting and executing instructions. In certain embodiments, processor 114 may receive instructions from a software application or module. These instructions may cause processor 114 to perform the functions of one or more of the example embodiments described and/or illustrated herein.

System memory 116 generally represents any type or form of volatile or non-volatile storage device or medium capable of storing data and/or other computer-readable instructions. Examples of system memory 116 include, without limitation, RAM, ROM, flash memory, or any other suitable memory device. Although not required, in certain embodiments computing system 110 may include both a volatile memory unit (such as, for example, system memory 116) and a non-volatile storage device (such as, for example, primary storage device 132).

Computing system 110 may also include one or more components or elements in addition to processor 114 and system memory 116. For example, in the embodiment of FIG. 1, computing system 110 includes a memory controller 118, an input/output (I/O) controller 120, and a communication interface 122, each of which may be interconnected via a communication infrastructure 112. Communication infrastructure 112 generally represents any type or form of infrastructure capable of facilitating communication between one or more components of a computing device. Examples of communication infrastructure 112 include, without limitation, a communication bus (such as an Industry Standard Architecture (ISA), Peripheral Component Interconnect (PCI), PCI Express (PCIe), or similar bus) and a network.

Memory controller 118 generally represents any type or form of device capable of handling memory or data or controlling communication between one or more components of computing system 110. For example, memory controller 118 may control communication between processor 114, system memory 116, and I/O controller 120 via communication infrastructure 112.

I/O controller 120 generally represents any type or form of module capable of coordinating and/or controlling the input and output functions of a computing device. For example, I/O controller 120 may control or facilitate transfer of data between one or more elements of computing system 110, such as processor 114, system memory 116, communication interface 122, display adapter 126, input interface 130, and storage interface 134.

Communication interface 122 broadly represents any type or form of communication device or adapter capable of facilitating communication between example computing system 110 and one or more additional devices. For example, communication interface 122 may facilitate communication between computing system 110 and a private or public network including additional computing systems. Examples of communication interface 122 include, without limitation, a wired network interface (such as a network interface card), a wireless network interface (such as a wireless network interface card), a modem, and any other suitable interface. In one embodiment, communication interface 122 provides a direct connection to a remote server via a direct link to a network, such as the Internet. Communication interface 122 may also indirectly provide such a connection through any other suitable connection.

Communication interface 122 may also represent a host adapter configured to facilitate communication between computing system 110 and one or more additional network or storage devices via an external bus or communications channel. Examples of host adapters include, without limitation, Small Computer System Interface (SCSI) host adapters, Universal Serial Bus (USB) host adapters, IEEE (Institute of Electrical and Electronics Engineers) 1394 host adapters, Serial Advanced Technology Attachment (SATA) and External SATA (eSATA) host adapters, Advanced Technology Attachment (ATA) and Parallel ATA (PATA) host adapters, Fibre Channel interface adapters, Ethernet adapters, or the like. Communication interface 122 may also allow computing system 110 to engage in distributed or remote computing. For example, communication interface 122 may receive instructions from a remote device or send instructions to a remote device for execution.

As illustrated in FIG. 1, computing system 110 may also include at least one display device 124 coupled to communication infrastructure 112 via a display adapter 126. Display device 124 generally represents any type or form of device capable of visually displaying information forwarded by display adapter 126. Similarly, display adapter 126 generally represents any type or form of device configured to forward graphics, text, and other data for display on display device 124.

As illustrated in FIG. 1, computing system 110 may also include at least one input device 128 coupled to communication infrastructure 112 via an input interface 130. Input device 128 generally represents any type or form of input device capable of providing input, either computer- or human-generated, to computing system 110. Examples of input device 128 include, without limitation, a keyboard, a pointing device, a speech recognition device, or any other input device.

As illustrated in FIG. 1, computing system 110 may also include a primary storage device 132 and a backup storage device 133 coupled to communication infrastructure 112 via a storage interface 134. Storage devices 132 and 133 generally represent any type or form of storage device or medium capable of storing data and/or other computer-readable instructions. For example, storage devices 132 and 133 may be a magnetic disk drive (e.g., a so-called hard drive), a floppy disk drive, a magnetic tape drive, an optical disk drive, a flash drive, or the like. Storage interface 134 generally represents any type or form of interface or device for transferring data between storage devices 132 and 133 and other components of computing system 110.

In one example, databases 140 may be stored in primary storage device 132. Databases 140 may represent portions of a single database or computing device or it may represent multiple databases or computing devices. For example, databases 140 may represent (be stored on) a portion of computing system 110 and/or portions of example network architecture 200 in FIG. 2 (below). Alternatively, databases 140 may represent (be stored on) one or more physically separate devices capable of being accessed by a computing device, such as computing system 110 and/or portions of network architecture 200.

Continuing with reference to FIG. 1, storage devices 132 and 133 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 132 and 133 may also include other similar structures or devices for allowing computer software, data, or other computer-readable instructions to be loaded into computing system 110. For example, storage devices 132 and 133 may be configured to read and write software, data, or other computer-readable information. Storage devices 132 and 133 may also be a part of computing system 110 or may be separate devices accessed through other interface systems.

Many other devices or subsystems may be connected to computing system 110. Conversely, all of the components and devices illustrated in FIG. 1 need not be present to practice the embodiments described herein. The devices and subsystems referenced above may also be interconnected in different ways from that shown in FIG. 1. Computing system 110 may also employ any number of software, firmware, and/or hardware configurations. For example, the example embodiments disclosed herein may be encoded as a computer program (also referred to as computer software, software applications, computer-readable instructions, or computer control logic) on a computer-readable medium.

The computer-readable medium containing the computer program may be loaded into computing system 110. All or a portion of the computer program stored on the computer-readable medium may then be stored in system memory 116 and/or various portions of storage devices 132 and 133. When executed by processor 114, a computer program loaded into computing system 110 may cause processor 114 to perform and/or be a means for performing the functions of the example embodiments described and/or illustrated herein. Additionally or alternatively, the example embodiments described and/or illustrated herein may be implemented in firmware and/or hardware.

Figure 2:
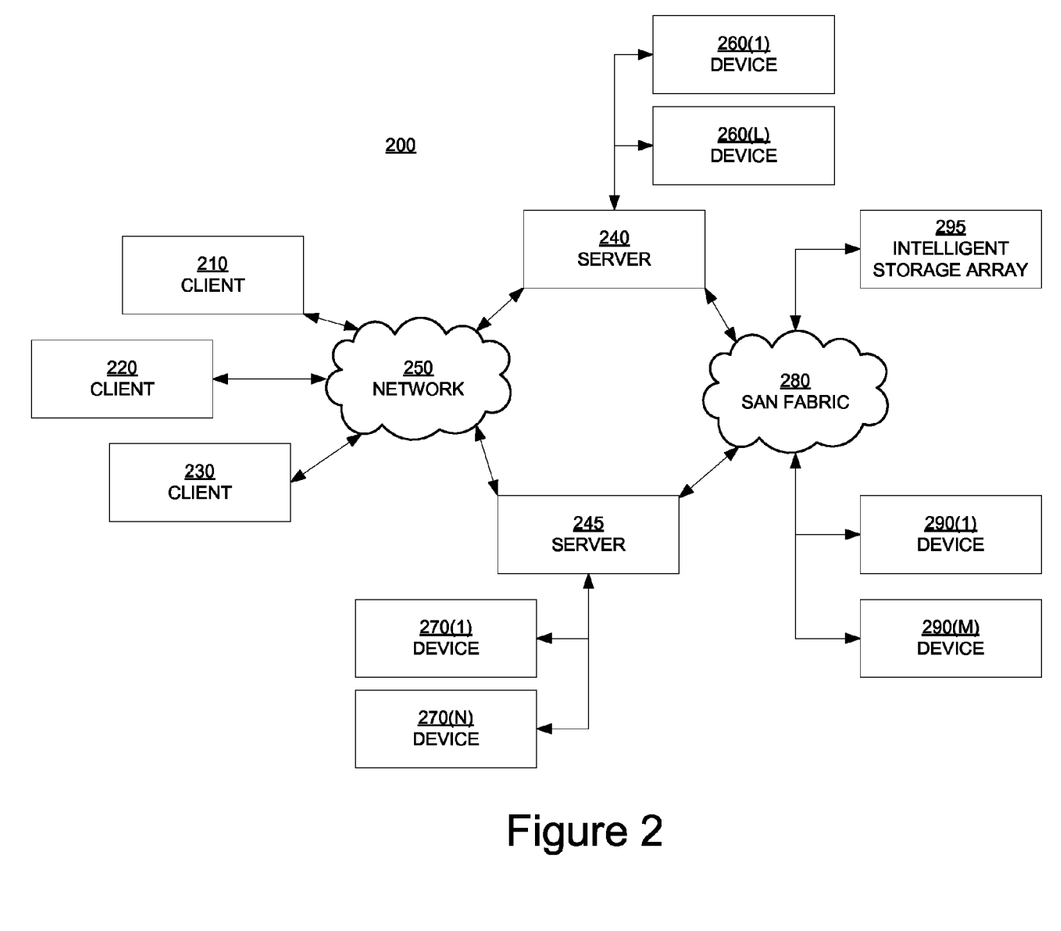
FIG. 2 is a block diagram of an example of a network architecture capable of implementing embodiments of the present disclosure.

FIG. 2 is a block diagram of an example of a network architecture 200 in which client systems 210, 220, and 230 and servers 240 and 245 may be coupled to a network 250. Client systems 210, 220, and 230 generally represent any type or form of computing device or system, such as computing system 110 of FIG. 1.

Similarly, servers 240 and 245 generally represent computing devices or systems, such as application servers or database servers, configured to provide various database services and/or run certain software applications. Network 250 generally represents any telecommunication or computer network including, for example, an intranet, a wide area network (WAN), a local area network (LAN), a personal area network (PAN), or the Internet.

As illustrated in FIG. 2, one or more storage devices 260(1)-(L) may be directly attached to server 240. Similarly, one or more storage devices 270(1)-(N) may be directly attached to server 245. Storage devices 260(1)-(L) and storage devices 270(1)-(N) generally represent any type or form of storage device or medium capable of storing data and/or other computer-readable instructions. Storage devices 260(1)-(L) and storage devices 270(1)-(N) may represent network-attached storage (NAS) devices configured to communicate with servers 240 and 245 using various protocols, such as Network File System (NFS), Server Message Block (SMB), or Common Internet File System (CIFS).

Servers 240 and 245 may also be connected to a storage area network (SAN) fabric 280. SAN fabric 280 generally represents any type or form of computer network or architecture capable of facilitating communication between storage devices. SAN fabric 280 may facilitate communication between servers 240 and 245 and storage devices 290(1)-(M) and/or an intelligent storage array 295. SAN fabric 280 may also facilitate, via network 250 and servers 240 and 245, communication between client systems 210, 220, and 230 and storage devices 290(1)-(M) and/or intelligent storage array 295 in such a manner that devices 290(1)-(M) and array 295 appear as locally attached devices to client systems 210, 220, and 230. As with storage devices 260(1)-(L) and storage devices 270(1)-(N), storage devices 290(1)-(M) and intelligent storage array 295 generally represent any type or form of storage device or medium capable of storing data and/or other computer-readable instructions.

With reference to computing system 110 of FIG. 1, a communication interface, such as communication interface 122, may be used to provide connectivity between each client system 210, 220, and 230 and network 250. Client systems 210, 220, and 230 may be able to access information on server 240 or 245 using, for example, a Web browser or other client software. Such software may allow client systems 210, 220, and 230 to access data hosted by server 240, server 245, storage devices 260(1)-(L), storage devices 270(1)-(N), storage devices 290(1)-(M), or intelligent storage array 295. Although FIG. 2 depicts the use of a network (such as the Internet) for exchanging data, the embodiments described herein are not limited to the Internet or any particular network-based environment.

Returning to FIG. 2, in one embodiment, all or a portion of one or more of the example embodiments disclosed herein are encoded as a computer program and loaded onto and executed by server 240, server 245, storage devices 260(1)-(L), storage devices 270(1)-(N), storage devices 290(1)-(M), intelligent storage array 295, or any combination thereof. All or a portion of one or more of the example embodiments disclosed herein may also be encoded as a computer program, stored in server 240, run by server 245, and distributed to client systems 210, 220, and 230 over network 250.

Figure 3:
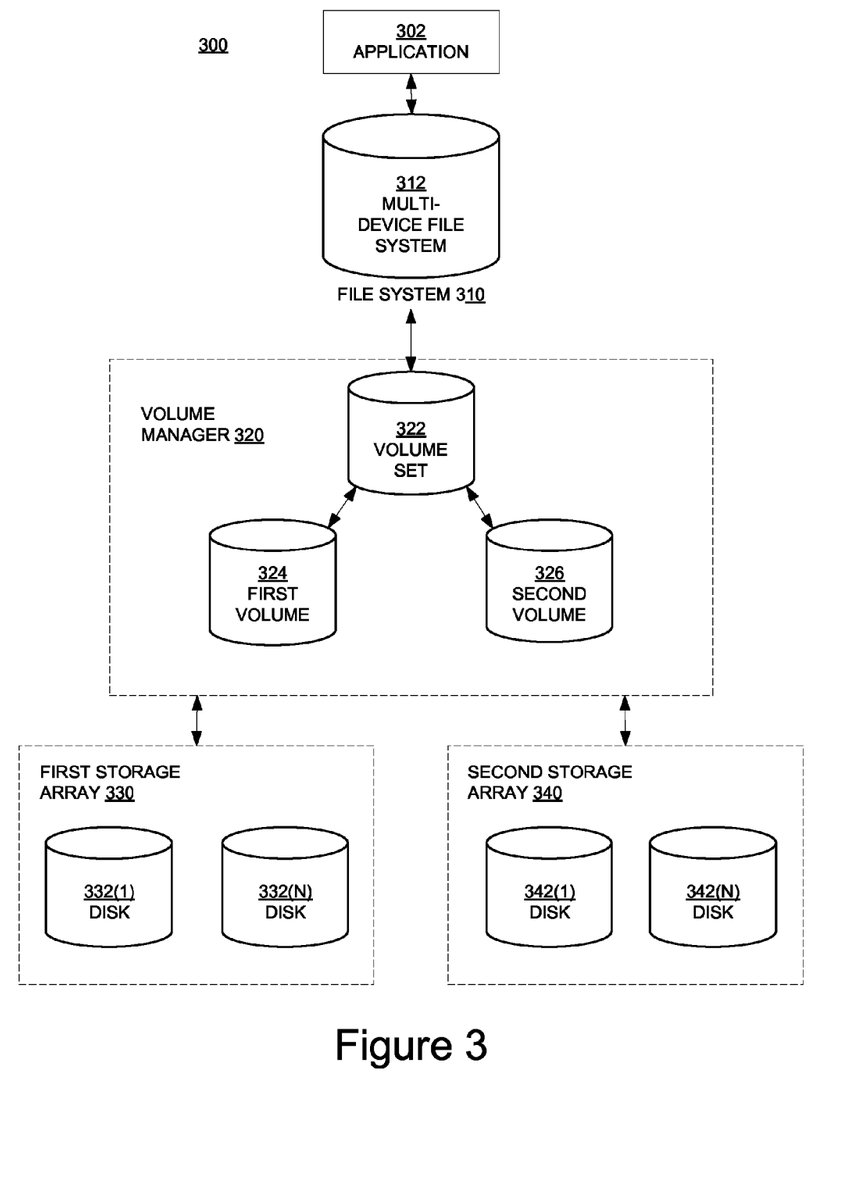
FIG. 3 is a block diagram of an example of a storage system capable of implementing embodiments of the present disclosure.

FIG. 3 is a block diagram of an example of a storage system 300 upon which embodiments of the present disclosure may be implemented. System 300 may include an application 302 in communication with an object-based file system 310. File system 310 may include a multi-device file system 312 for multi-device storage. Multi-device storage generally refers to the use of different virtual or physical storage devices that provide differentiated storage for computing systems.

Storage system 300 can support multi-volume file systems through multi-device file system 312 and can provide automatic policy-based placement of portions (e.g., extents or blocks) of files within file system 310. A multi-volume file system may include file systems that occupy two or more virtual storage volumes. A multi-volume file system may present a single name space, making the existence of multiple volumes transparent to users and applications while maintaining awareness of each volume's identity, making it possible to control the locations at which portions of files are stored. In one embodiment, all files in multi-volume file system may be part of the same name space and are accessed and manipulated as though they occupy a single volume.

System 300 may also include a volume manager 320. Volume manager 320 may implement software-based virtualization for facilitating multi-device storage in the form of virtual volumes configured from multiple hardware devices. Volume manager 320 may include a volume set 322. As used herein, the phrase "volume set" generally refers to the volumes on which a file system is constructed. Volume set 322 may be divided into a first volume 324 and a second volume 326. For example, first volume 324 may include a first storage array 330 (e.g., disk 332(1) through disk 332(N)). Similarly, second volume 326 may include a second storage array 340 (e.g., disk 342(1) through disk 342 (N)).

Volume set 322 may be configured in a variety of manners. For example, first volume 324 and/or second volume 326 may be configured from enterprise disk array logical unit number units (LUNs), mid-range disk array LUNs, and/or disks connected directly to their host systems. First volume 324 and/or second volume 326 may also represent more complex configurations, such as mirrored volumes configured from RAID (Redundant Array of Independent Disks) LUNs presented by two disk arrays.

Figure 4:
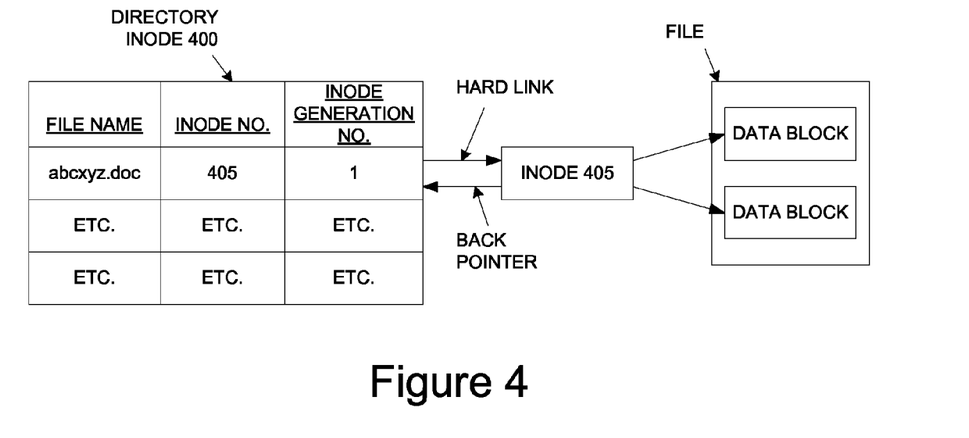
FIG. 4 is a block diagram illustrating a directory (e.g., a directory inode) according to an embodiment of the present disclosure.

FIG. 4 is a block diagram illustrating a directory or database 400 according to an embodiment of the present disclosure. In the example of FIG. 4, directory 400 represents a directory (e.g., a directory inode). The directory inode includes content such as file names and data structures (e.g., inodes), which are identified by data structure numbers (e.g., inode numbers) that correspond to the file names—the directory inode maps file names to inode numbers.

In the present embodiment, an inode (e.g., inode 405) contains information about a file, except for the file name (which is in the directory inode). Information in an inode includes, but is not necessarily limited to, the type of file, permissions associated with the file, the link count, the file's size, information about when the inode or file was last accessed and modified and/or a version number for the inode, a back pointer to the directory inode, and address(es) that point to data block(s) or data object(s) that store the actual contents of the file (that is, the file data itself). For each inode, a link count in the inode keeps track of how many directory entries point to (refer to) that inode—the link count counts the number of "hard links" to an inode.

The pointers in the inode include pointers that directly point to blocks of the file's data (as shown in FIG. 4), a singly indirect pointer (a pointer that points to a block of pointers that in turn point to blocks of the file's data; not shown), a doubly indirect pointer (a pointer that points to a block of pointers that point to other blocks of pointers that point to blocks of the file's data; not shown), and a triply indirect pointer (a pointer that points to a block of pointers that point to other blocks of pointers that point to yet other blocks of pointers that point to blocks of the file's data; not shown).

In the present embodiment, a data structure version number (e.g., an inode generation number) is associated with each inode number. An inode number is associated with a particular file when that file is created; when that file is deleted, the inode number may be reassigned to another file when that other file is created. Each time an inode number is reassigned is this manner, the inode generation number for that inode number is changed (e.g., incremented). The latest inode generation number is also referred to herein as the "current" inode generation number.

Figure 5:
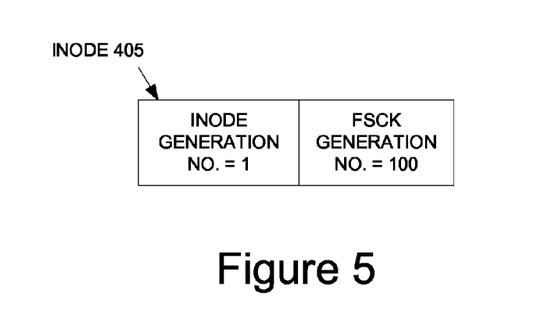
FIG. 5 is a block diagram illustrating a data structure (e.g., an inode) according to an embodiment of the present disclosure.

FIG. 5 is a block diagram illustrating information included in selected fields of inode 405 according to an embodiment of the present disclosure. An inode may include information in addition to that shown in FIG. 5. In the example of FIG. 5, the current inode generation number is also included in (or otherwise associated with) the inode.

According to embodiments of the present disclosure, an examination generation number (e.g., a FSCK generation number) is also included in (or otherwise associated with) each inode. For ease of discussion, the following discussion will refer to a FSCK generation number, although embodiments described herein are not limited to the use of the FSCK utility. The FSCK generation number associated with an inode is also referred to herein as the "first counter value." Generally speaking, the FSCK generation number is incremented each time the FSCK utility is executed. The latest FSCK generation number is also referred to herein as the "current" FSCK generation number. The FSCK generation number and its use will be described further below.

Figure 6:
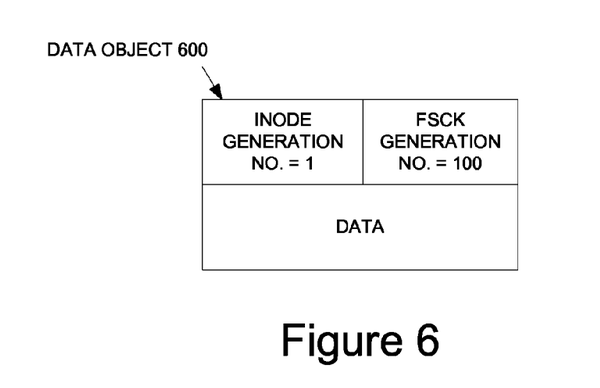
FIG. 6 is a block diagram illustrating a data object according to an embodiment of the present disclosure.

FIG. 6 is a block diagram illustrating information included in selected fields of a data object 600 according to an embodiment of the present disclosure. A data object may include information other than that shown in FIG. 6. In the example of FIG. 6, in addition to the data itself, the data object 600 includes an inode generation number and a FSCK generation number. The FSCK generation number associated with a data object is also referred to herein as the "second counter value." The data may be stored in one or more data blocks.

In one embodiment, an object identifier (ID) is not stored for each data object. Instead, the object ID is generated when it is needed. In such an embodiment, the object ID is generated by concatenating the inode number, a memory partition number for the partition in which the object is stored, and an offset value corresponding to the location of the object in a data block. Storing object IDs can consume a significant amount of computer system memory. Thus, by calculating the object IDs instead of storing them, memory resources are saved.

With reference to FIGS. 4, 5, and 6, the directory inode 400 includes reference to the file "abcxyz.doc," which is associated with inode 405 and the current inode generation number (equal to 1 in the example). Inode 405 also includes the current inode generation number (1) and the current FSCK generation number (equal to 100 in the example). In the example of FIG. 6, the data object (file) 600 for "abcxyz.doc" also includes the current inode generation number (1) and the current FSCK generation number (100).

The directory inode, the inodes listed in the directory, and the data objects associated with the inodes listed in the directory can be accessed and validated using a utility such as FSCK. The utility reads and validates the contents of the directory inode 400. For example, the file names can be checked to make sure that they are valid file names (e.g., they do not include invalid characters).

The inodes identified in the directory inode can then be investigated to check on a number of things. For example, each inode can be checked to verify that it actually exists and that it is a file. The number of back pointers associated with each inode can be checked to make sure that it equals the number of hard links to that inode. Other information associated with the inodes can be checked. For example, the size of the file associated with each inode can be checked to make sure it is within reasonable bounds. The number of free inodes can be determined. Other types of checks known in the art can be performed on the inodes.

Furthermore, if inconsistencies are detected, then the examination utility (e.g., FSCK) can implement corrective actions. For example, if the stored link count and the actual link count do not match, then the stored link count can be updated with the actual link count. If an inode number in the directory inode points to an unreferenced inode, then the entry in the directory can be removed. Other corrective actions known in the art can be performed depending on the type of inconsistency that is detected.

Also, in some instances, corrective actions cannot be performed on inodes that fail the sanity check. Those inodes can be marked or categorized as "bad." During the final pass over the inode list, the FSCK process can move the bad inodes to a lost+found directory (e.g., /lost+found/fsck_gen#bad).

Figure 7:
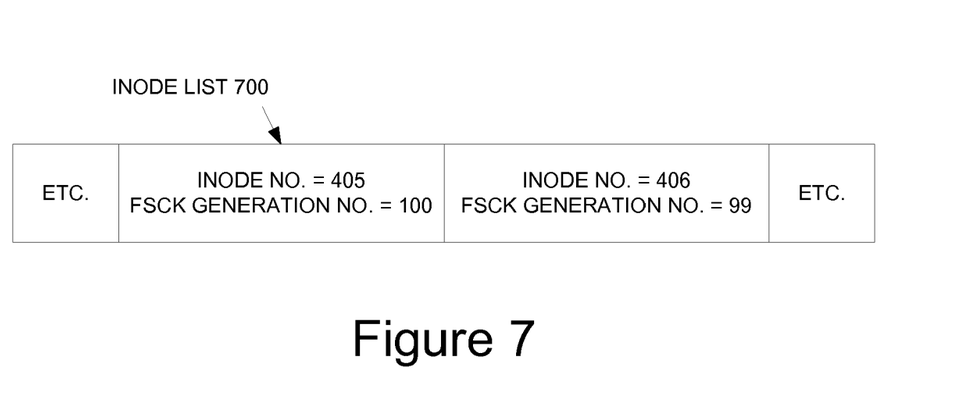
FIG. 7 is a block diagram illustrating a data structure (e.g., inode) list according to an embodiment of the present disclosure.

FIG. 7 is an example of an inode list 700 or ILIST according to an embodiment of the disclosure. An inode list may include information other than that shown in FIG. 7. In the example of FIG. 7, the inode list 700 includes an entry for each inode and a FSCK generation number for each inode in the list. The FSCK generation number may be the current FSCK generation number (e.g., inode 405 has a FSCK generation number equal to 100) or it may be an earlier generation number (e.g., inode 406 has a FSCK generation number equal to 99). As will be seen from the discussion to come, the FSCK generation number in the inode list 700 can be used to identify allocated inodes and, conversely, unreferenced inodes. In general, inodes in the inode list that have a FSCK generation number that is the same as the current FSCK generation number are allocated, and inodes in the inode list that have a FSCK generation number that is different from the current FSCK generation number are unreferenced. In the example of FIG. 7, inode 405 is allocated and inode 406 is not.

Figure 8:
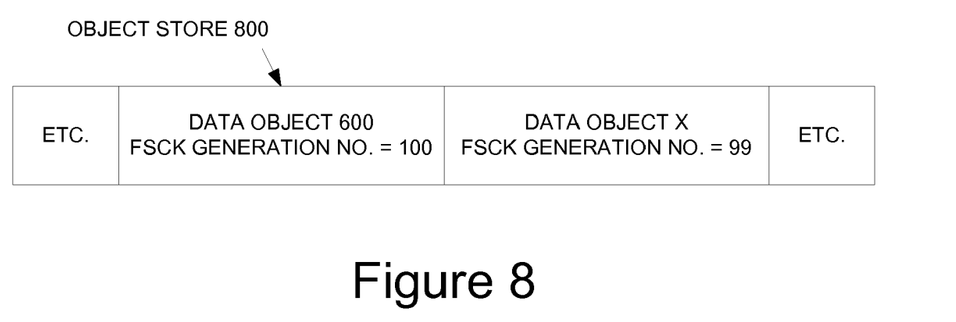
FIG. 8 is a block diagram illustrating an object store according to an embodiment of the present disclosure.

FIG. 8 is an example of an object store 800 according to an embodiment of the disclosure. An object store may include information other than that shown in FIG. 8. In the example of FIG. 8, the object store 800 includes an entry for each data object and a FSCK generation number for each data object in the list. The FSCK generation number may be the current FSCK generation number (e.g., 100) or it may be an earlier generation number (e.g., 99). In a manner similar to that mentioned above, and as will be described more fully below, the FSCK generation number in the object store 800 can be used to identify allocated data objects and, conversely, unreferenced data objects. In general, data objects in the data store that have a FSCK generation number that is the same as the current FSCK generation number are allocated, and data objects in the data store that have a FSCK generation number that is different from the current FSCK generation number are unreferenced.

Figure 9:
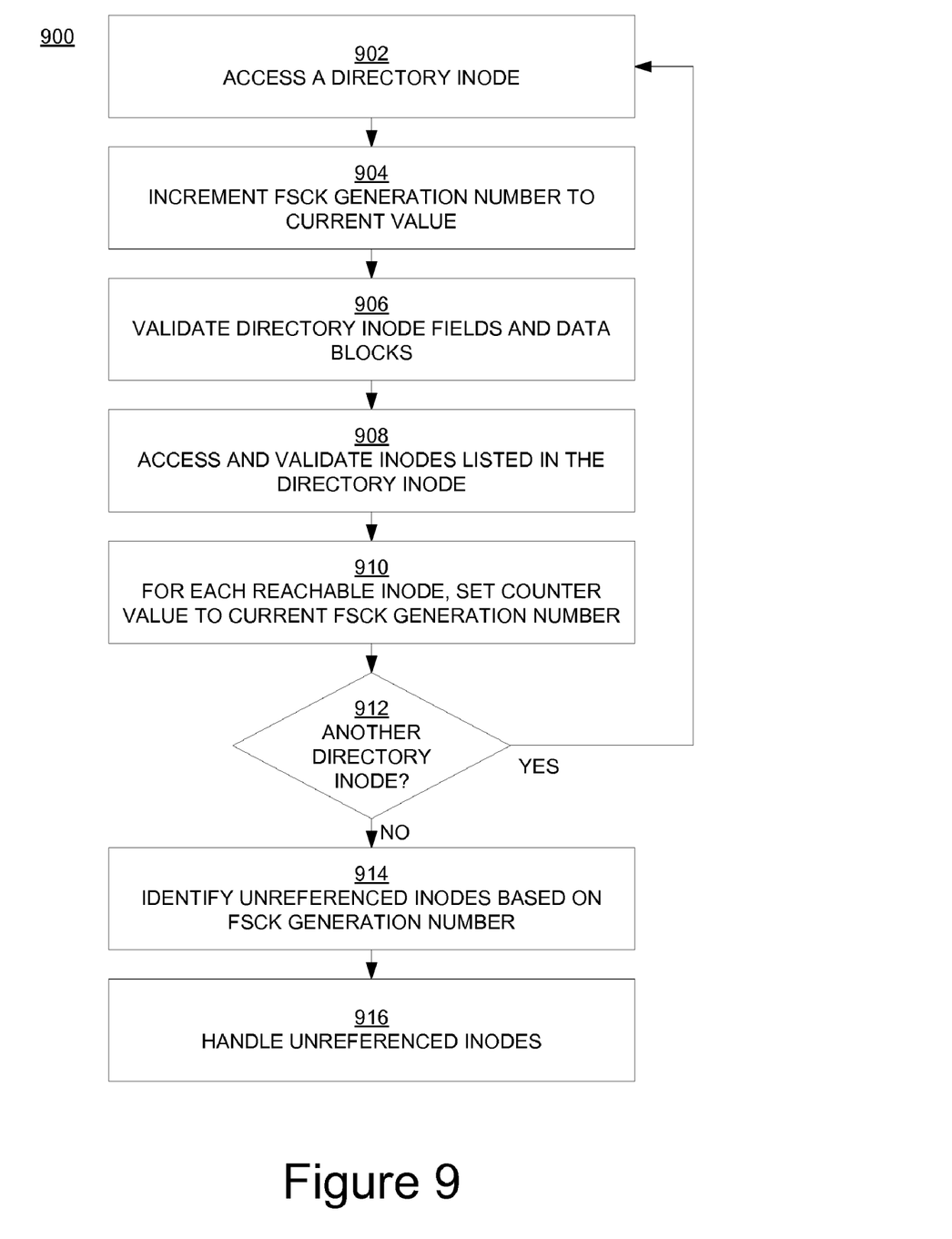
FIG. 9 is a flowchart of a computer-implemented process for indentifying unreferenced data structures (e.g., unreferenced inodes) according to an embodiment of the present disclosure.
Figure 10:
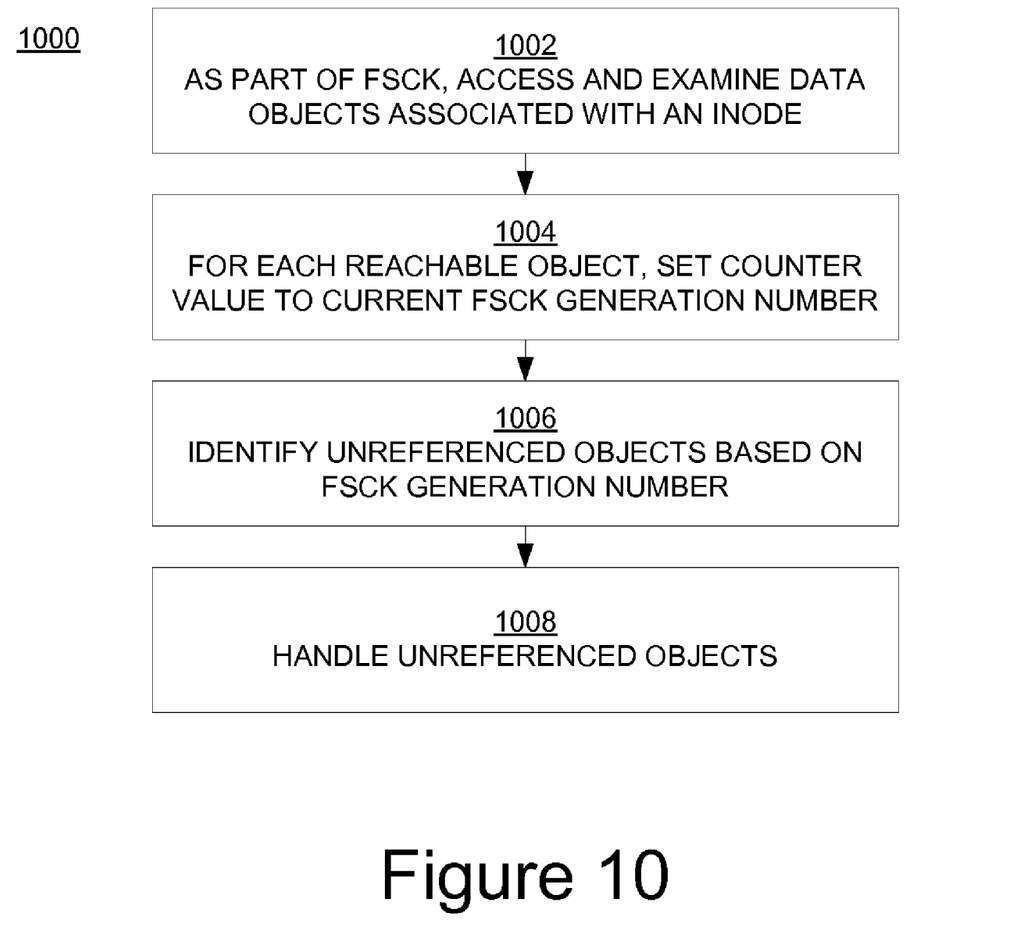
FIG. 10 is a flowchart of a computer-implemented process for indentifying unreferenced data objects according to an embodiment of the present disclosure.

FIGS. 9 and 10 are flowcharts 900 and 1000 of computer-implemented processes for identifying unreferenced resources ("garbage collection") according to embodiments of the invention. Flowcharts 900 and 1000 can be implemented as computer-executable instructions residing on some form of computer-readable storage medium (e.g., using computing system 110 of FIG. 1). The flowcharts are discussed in combination with the examples of FIGS. 4-8.

In block 902, a directory (e.g., directory inode 400) that includes a list (also referred to herein as the "first list") of data structures (e.g., inodes) is accessed. Each of the data structures is identified by a data structure number (e.g., an inode number). Also, a counter value (e.g., an inode generation number; specifically, the current inode generation number) is associated with each data structure in the list. For clarity of discussion, the remainder of the flowchart will be discussed in the context of inodes, although embodiments described herein are not so limited.

The inodes in the directory inode 400 are to be examined and validated using an examination utility such as, but not limited to, the FSCK utility. In block 904, a current generation number (e.g., a FSCK generation number) is associated with the examination process. As mentioned above, each time the examination process is executed, a stored value for the generation number is read and incremented to produce the current value. For clarity of discussion, the remainder of the flowchart will be discussed in the context of FSCK, although embodiments described herein are not so limited.

In block 906, the contents of the directory inode 400 are read and validated as mentioned above, for example.

In block 908, each inode listed in the directory inode 400 is accessed and validated as discussed above, for example.

In block 910, the FSCK generation number (first counter value) associated with each inode that is accessed in block 908 is set equal to the current FSCK generation number. Notably, if an inode is not accessed, then the FSCK generation number for that inode is not changed.

In block 912, if there is another directory inode, then the flowchart returns to block 902; otherwise, the flowchart continues to block 914.

Accordingly, once the FSCK generation numbers for the reachable inodes listed in the directory inode (all reachable inodes in all directories in the file system) are changed to the current FSCK generation number, any unreferenced inodes can be identified—the unreferenced inodes will have a FSCK generation number that is different from the current FSCK generation number.

In one embodiment, a "second list" (e.g., inode list 700) is used to identify unreferenced inodes. More specifically, in block 914, the unreferenced inodes are identified by examining the inode list 700 and the FSCK generation numbers associated with the inodes in that list. If the FSCK generation number for an inode in the inode list 700 is different from the current FSCK generation number, then that inode is unreferenced.

In block 916, unreferenced inodes can be discarded or marked as free so that their respective inode numbers can be recycled (assigned to another file). Alternatively, unreferenced inodes may be moved to a lost+found directory, and/or a system administrator may be notified so that corrective actions can be performed.

The process just described can also be used to update link counts for inodes in the directory inode 400 and other directories. For example, each time an inode is properly accessed via a directory inode, the link count for that inode can be incremented. Link counts for unreferenced inodes can be set to zero.

With reference now to FIG. 10, a similar process can be used to identify an unreferenced data object. Flowchart 1000 of that figure is discussed in the context of data objects associated with one of the inodes in the directory inode 400. In practice, the process described by flowchart 1000 is repeated for each reachable data object associated with a particular inode, and for each reachable inode in the directory inode.

In block 1002, data objects (exemplified by data object 600) associated with inode 405 are accessed and examined as part of the FSCK process. An inode version number and a FSCK generation number (also referred to as a "second counter value") are included in (or otherwise associated with) each of the data objects.

In block 1004, for each data block accessed in block 1002, the respective FSCK generation number for the data block is set to the current FSCK generation number (discussed above) if the inode version number for that data object matches the current inode version number (the inode version number associated with inode 405). Notably, if a data object is not accessed or has an inode generation number that is different from the current inode version number, then the FSCK generation number for that data object is not changed.

Once the FSCK generation numbers for the reachable and correctly versioned data objects are changed to the current FSCK generation number, unreferenced data objects can be identified—the unreferenced data objects will have a FSCK generation number that is different from the current FSCK generation number.

In one embodiment, unreferenced data objects are identified using a separate data store (e.g., object store 800) that identifies the data objects and their corresponding FSCK generation numbers. More specifically, in block 1006, the FSCK generation numbers for the data objects in the data store are compared to the current FSCK generation number to identify any unreferenced data objects. If the FSCK generation number for a data object in the data store is different from the current FSCK generation number, then that data object is unreferenced.

In block 1008, unreferenced data objects can then be discarded (e.g., deleted) or marked as free, and/or a system administrator can be alerted.

In summary, by marking reachable inodes and data objects in the file system namespace with the current FSCK generation number, the use of memory for garbage collection is reduced. Unreferenced inodes in the inode list will have an older FSCK generation number, allowing them to be readily identified so that they can be freed up or moved to a lost+found directory. Similarly, data objects with an older FSCK generation number can be removed from the object store.

Although described using FSCK as an example, embodiments of the present disclosure are not so limited. In general, the functionality described herein can be applied to any garbage collection procedure.

Furthermore, while the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because different architectures can be implemented to achieve the same functionality.

The process parameters and sequence of steps described and/or illustrated herein are given by way of example only. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Embodiments according to the invention are thus described. While the present disclosure has been described in particular embodiments, it should be appreciated that the invention should not be construed as limited by such embodiments, but rather construed according to the below claims.

What is claimed is:

1. A non-transitory computer-readable storage medium having computer-executable instructions for causing a computer system to perform a method comprising:

accessing a directory comprising a first list of data structures, each of said data structures identified by a data structure number and having a version number and a first counter value associated therewith;

examining said data structures, wherein a generation number is associated with said examining;

for each data structure in said first list that is examined, setting its respective first counter value to said generation number; and subsequent to setting first counter values for data structures in said first list that are examined, identifying any unreferenced data structures, wherein said unreferenced data structures include data structures that have a first counter value that is different from said generation number.

2. The computer-readable storage medium of claim 1 wherein said method further comprises:

examining data objects associated with a data structure in said first list, wherein each of said data objects has a version number and a second counter value associated therewith;

for each data object of said data objects that is examined, setting its respective second counter value to said generation number if its respective version number matches a version number assigned to said data structure; and subsequent to setting second counter values for data objects that are examined, identifying unreferenced data objects, wherein said unreferenced data objects include data objects that have a second counter value that is different from said generation number.

3. The computer-readable storage medium of claim 2 wherein said data structures comprise inodes and said data objects are examined as part of a file system consistency check, and wherein said generation number corresponds to a file system consistency check generation number.

4. The computer-readable storage medium of claim 2 wherein said method further comprises an operation selected from the group consisting of: discarding said unreferenced data objects; and marking said unreferenced data objects as free.

5. The computer-readable storage medium of claim 2 wherein said method further comprises generating an identifier for a data object associated with said data structure using the data structure number for said data structure, a partition number associated with said data object, and an offset value.

6. The computer-readable storage medium of claim 1 wherein said method further comprises identifying said unreferenced data structures by examining a second list of data structures and first counter values associated with data structures in said second list.

7. The computer-readable storage medium of claim 1 wherein said method further comprises an operation selected from the group consisting of: discarding said unreferenced data structures; and marking said unreferenced data structures as free.

8. The computer-readable storage medium of claim 1 wherein said method further comprises moving said unreferenced data structures to a lost-and-found directory.

9. The computer-readable storage medium of claim 1 wherein said method further comprises updating link counts for said data structures in said first list.

10. A computer system comprising:

a processor; and memory coupled to said processor and having stored therein instructions that, if executed by said computer system, cause said computer system to execute operations comprising:

accessing a directory comprising a first list comprising file names and inodes, said inodes identified by respective inode numbers;

examining said inodes as part of a file system consistency check, wherein a file system consistency check generation number is associated with said examining;

for each of said inodes examined during said file system consistency check, setting a respective first counter value to said file system consistency check generation number; and subsequent to setting the first counter values, identifying unreferenced inodes, wherein said unreferenced inodes include inodes that have a first counter value that is different from said file system consistency check generation number.

11. The computer system of claim 10 wherein said operations further comprise:

during said file system consistency check, examining data objects associated with an inode in said first list, wherein each of said data objects has an inode generation number and a second counter value associated therewith;

for each data object of said data objects that is examined during said file system consistency check, setting a respective second counter value to said during said file system consistency check generation number if a respective inode generation number for the data object matches said file system consistency check generation number; and subsequent to setting the second counter values, identifying unreferenced data objects, wherein said unreferenced data objects include data objects that have a second counter value that is different from said file system consistency check generation number.

12. The computer system of claim 10 wherein said operations further comprise an operation selected from the group consisting of: discarding said unreferenced data objects; and marking said unreferenced data objects as free.

13. The computer system of claim 10 wherein said unreferenced nodes are identified by examining a second list of inodes and first counter values associated with inodes in said second list.

14. The computer system of claim 10 wherein said operations further comprise an operation selected from the group consisting of: discarding said unreferenced inodes; and marking said unreferenced inodes as free.

15. The computer system of claim 10 wherein said operations further comprise moving said unreferenced inodes to a lost-and-found directory.

16. A computer-implemented method comprising:

implementing a file system consistency check, wherein said implementing comprises incrementing a file system consistency check generation value;

during said file system consistency check, examining inodes in a first list, each of said inodes having a respective first counter value associated therewith;

for each inode is said first list that is examined, changing its first counter value to said file system consistency check generation value; and subsequent to said changing, comparing first counter values for inodes in a second list to said file system consistency check generation value to identify unreferenced inodes, wherein said unreferenced inodes comprise inodes in said second list that have a first counter value different from said file system consistency check generation value.

17. The method of claim 16 further comprising:

examining data objects associated with an inode in said first list, wherein each of said data objects has an inode generation number and a second counter value associated therewith;

for each data object of said data objects that is examined, setting its respective second counter value to said file system consistency check generation value if its respective inode generation number matches a generation number for said inode; and subsequent to setting second counter values for data objects that are examined, identifying unreferenced data objects, wherein said unreferenced data objects include data objects that have a second counter value that is different from said file system consistency check generation value.

18. The method of claim 17 further comprising discarding said unreferenced data objects.

19. The method of claim 16 further comprising identifying said unreferenced inodes by examining a second list of inodes and first counter values associated with inodes in said second list.

20. The method of claim 16 further comprising performing a corrective action selected from the group consisting of: discarding said unreferenced inodes; moving said unreferenced inodes to a lost-and-found directory; notifying a system administrator about said unreferenced inodes.

* * * * *